Aug. 28, 1934.   R. S. CONDON   1,971,598
HYDRAULIC CONTROL AND OPERATING MECHANISM FOR MACHINE TOOLS
Filed July 31, 1931   2 Sheets-Sheet 1

INVENTOR
Robert S. Condon
BY
his ATTORNEY

Aug. 28, 1934.  R. S. CONDON  1,971,598
HYDRAULIC CONTROL AND OPERATING MECHANISM FOR MACHINE TOOLS
Filed July 31, 1931  2 Sheets-Sheet 2
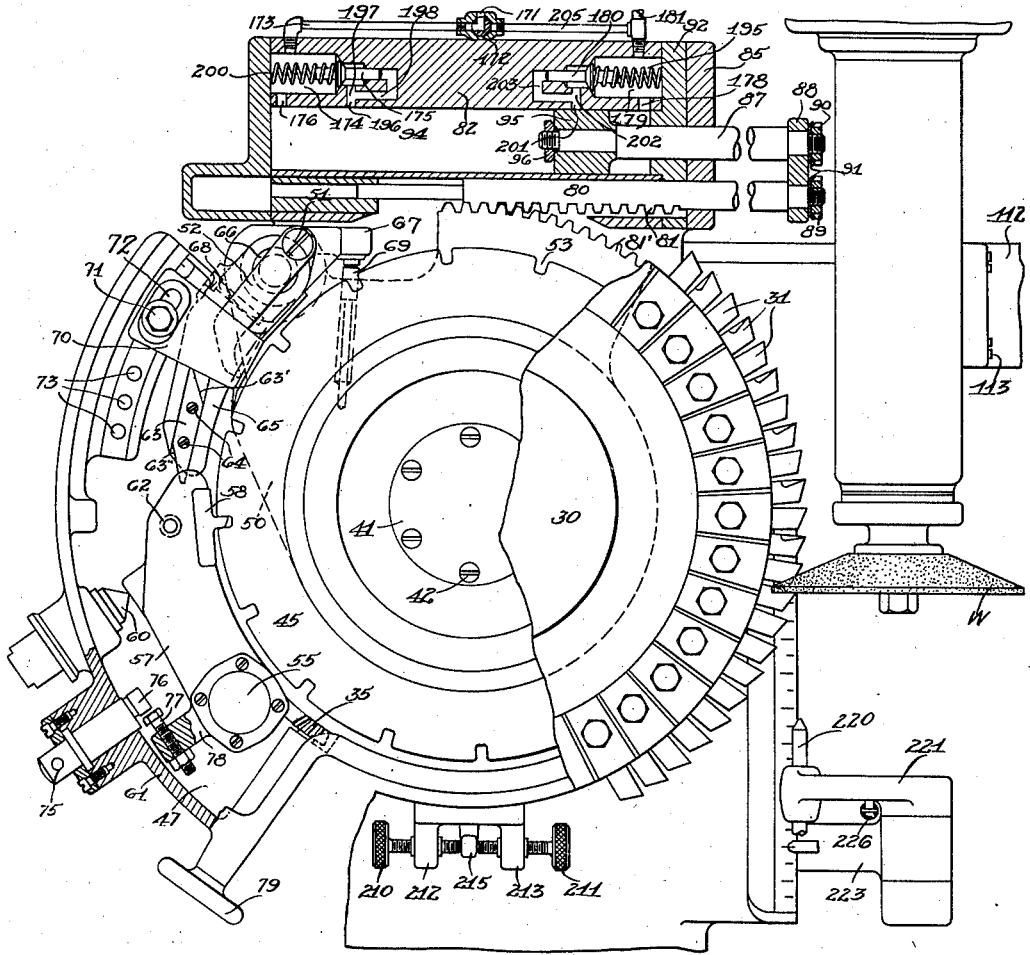
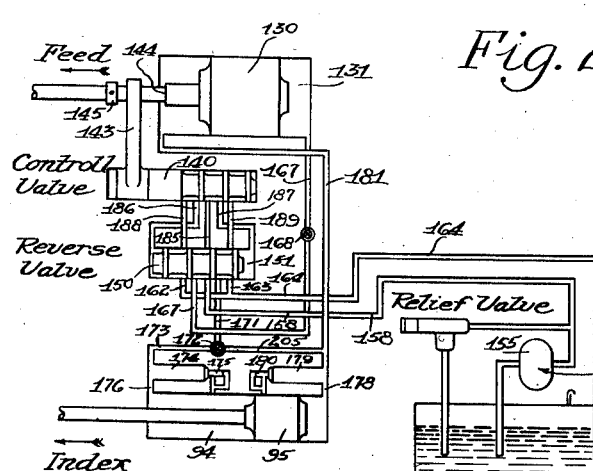
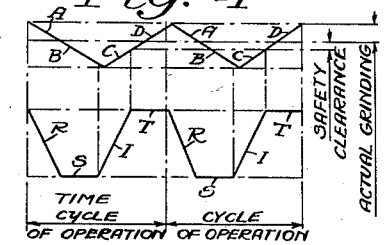
INVENTOR
Robert S. Condon
BY
his ATTORNEY Patented Aug. 28, 1934

1,971,598

UNITED STATES PATENT OFFICE 1,971,598

HYDRAULIC CONTROL AND OPERATING MECHANISM FOR MACHINE TOOLS

Robert S. Condon, Rochester, N. Y., assignor to Gleason Works, Rochester, N. Y., a corporation of New York Application July 31, 1931, Serial No. 554,303

6 Claims. (Cl. 51—225)

The present invention in its primary aspect relates to hydraulically operated machine tools, its principal purpose being to provide a simpler form of hydraulic control and operating mechanism for machine tools of the type in which two or more motions or two or more operations are required to be coordinated with one another.

In all machine tools, there are always adjustments required for positioning the work and tools in operative relation. Where the motions of two or more relatively adjustable parts must be timed with one another, as, for instance, a feed and an indexing motion, and it is desired to effect such motions by means of hydraulically operated mechanisms, it will be evident that the fewer the hydraulic leads between the relatively adjustable parts, the less costly the machine, the less liable it is to get out of order and the more likely it is to succeed. Each added lead multiplies the difficulties of making proper connections that will allow of the necessary adjustments. Through the present invention, the number of leads required to effect coordinated operation of a plurality of hydraulically actuated parts are reduced to a minimum, thereby simplifying the construction and, moreover, rendering it possible to employ hydraulics in machines where otherwise, due to the number of adjustments necessary, the employment of hydraulics would be wholly impractical.

The advantages of the present invention are attained by interlocked or series connection of the several hydraulic mechanisms which it is desired to actuate in timed relation. I have found that by the use of only two hydraulic leads to each part, two or more independent hydraulic mechanisms can not only be actuated but also coordinated to operate in timed relation. A common lead connects the two mechanisms and each has, in addition, a separate lead that is alternately put on supply and exhaust in order to produce the desired motions of the parts. The operation of the two parts is governed by a valve or other suitable control device which operates in such wise that when one of the independent leads is on supply, the other is on exhaust.

In a further aspect, the present invention relates to machines for sharpening cutting tools and especially to machines for sharpening milling cutters for gears and in this aspect, its purpose is to provide a cutter sharpener which will be fully automatic and yet simple in construction and operation.

The principal objects of the invention have already been referred to. Other objects of the invention will be apparent from the specification and from the appended claims.

In the drawings:

Figure 2 is a fragmentary plan view of this machine with parts broken away to show the construction and operation of the index mechanism;

Figure 3 is a diagrammatic view of the hydraulic operating mechanism of the machine; and Figure 4 is a diagrammatic view showing the cycle of operation of the machine.

Figure 1:
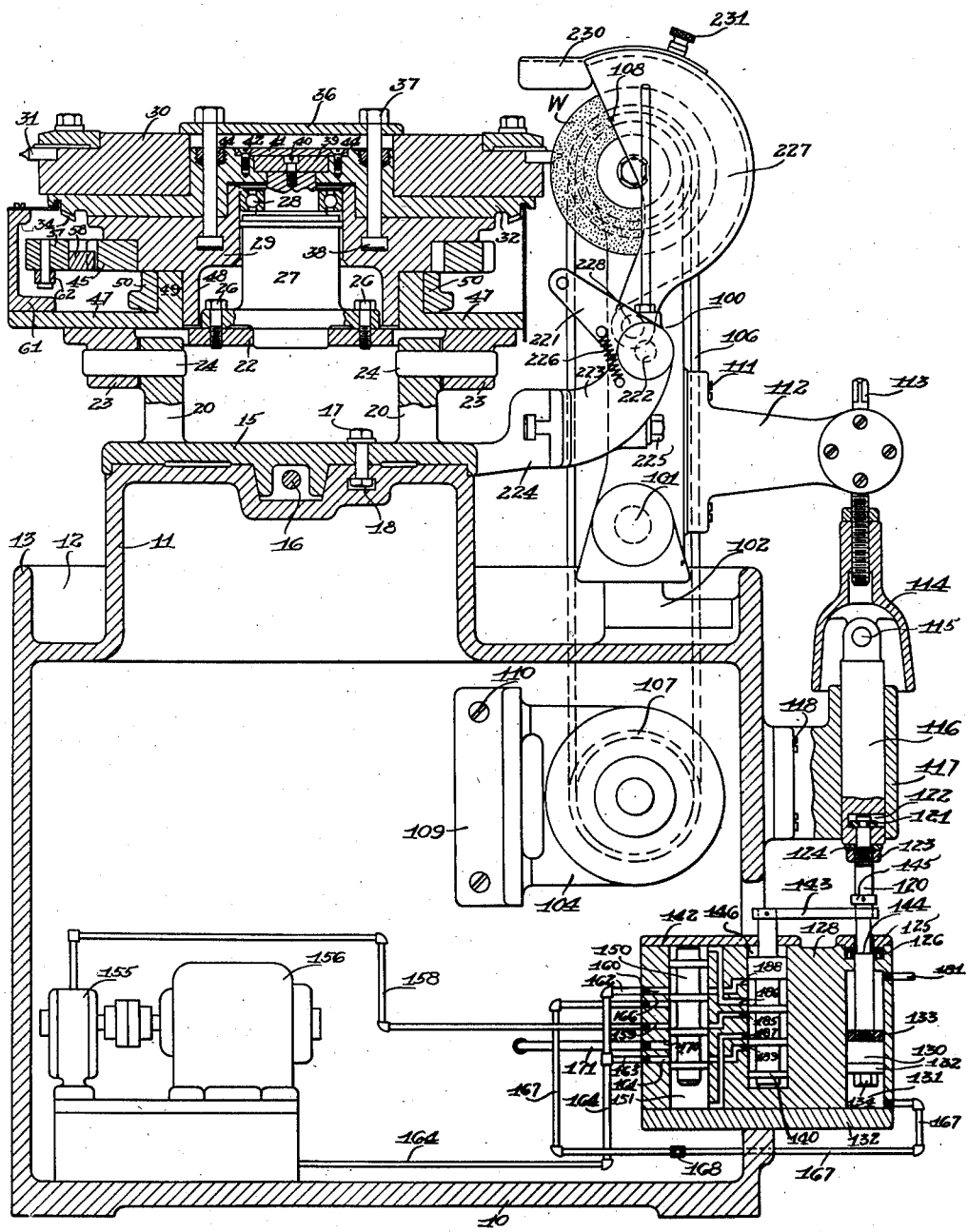
Figure 1 is a vertical sectional view of an automatic sharpener constructed according to this invention for sharpening milling cutters.

In the drawings, 10 indicates the base or frame of the cutter sharpener. This base or frame is hollow and receives the wheel drive motor, the pump, pump drive motor and parts of the hydraulic mechanism, as will hereinafter be more particularly described. The upper face of the base is formed to provide an elevated bed-portion 11 which is surrounded by a well or trough 12 formed between the flange 13 integral with the base and the side of the bed-portion 11.

15 designates a slide or table which is mounted on the bed-portion 11 and is slidably adjustable thereon. The adjustment of this table may be effected by means of a screw 16 which is secured in any suitable manner to the bed-portion 11 and threads into a nut (not shown) secured to the table 15. This is an ordinary construction and does not require further illustration. The table can be secured in any adjusted position on the bed-portion 11 by bolts 17, the heads of which engage in a slot 18 formed in the bed-portion 11 and extending parallel to the direction of adjustment of the table.

The table 15 is formed with two spaced lugs or arms 20 which extend upwardly therefrom. 22 designates a circular plate which is formed with a pair of depending ears 23. The plate 22 is swivelly adjustable on the table 15 being pivotally mounted thereon by means of the trunnion pins 24 which engage in the arms 20 and the ears 23.

Secured to the plate 22 by screws 26 is a post or bearing member 27. Mounted on an anti-friction bearing 28 on the post 27 is a supporting member 29. The cutter 30 whose blades 31 are to be sharpened is mounted on a ring or disc member 32 and the two are secured to the supporting member 29 by the clamping-disc 36 and the T-bolts 37, the heads of the latter engaging in a circular T-slot 38 formed in the supporting member 29. The disc 32 is connected to the bearing member, by the head piece 39 which is secured to the bearing member 27 by the screw 40. A cover-plate 41 is secured by screws 42 to the disc 32 to prevent entry of grit or dirt into the bearing 28. Likewise packings are provided about the T-bolts 37 as indicated at 44.

The ring member 32 has teeth cut into its lower face to form an integral bevel gear 34. There is a bevel pinion 35 (Fig. 2) in mesh with this gear. By rotating the pinion, the blades of the cutter can be adjusted into engagement with a gauge (not shown) which is mounted in a suitable position on the machine and which is provided to permit of testing the heights of the blades to determine whether they have been ground back far enough. The use of the testing gauge forms no part of the present invention and need not further be referred to here.

The cutter shown in the drawings is of the type described and claimed in the application of Schuyler H. Earl, Serial No. 504,578, filed December 24, 1930, but it will be understood that the present machine may be employed for sharpening any other type of milling cutter.

Keyed to the supporting member 29 is a notched index plate 45 (Figs. 1 and 2). This will be provided with a suitable number of notches. In sharpening a cutter such as shown in the drawings, the number of notches in the plate 45 will equal half the number of blades in the cutter to be sharpened, for alternate blades of the cutter are adapted to cut on opposite sides of a tooth space of a gear blank and are accordingly sharpened with opposite shear angles on their front faces. In sharpening a cutter such as shown in the drawings, therefore, the cutter head is indexed two blades at a time and all of the blades which cut on one side of the tooth space are first ground and then the cutter is set over and all of the remaining blades ground. The set-over may be effected in the usual fashion by rocking the support 22 on its trunnions 24.

47 designates a plate which is rotatably adjustable upon the plate 22 and which is centered on the depending bearing portion 48 of the supporting member 29. The hub or sleeve-portion 49 of the plate 47 serves as a bearing for an arm 50 (Figs. 1 and 2).

Pivotally mounted on a stud 51, which is secured in the arm 50, is a pawl 52. When the arm 50 is rotated on the plate 47 in a counter-clockwise direction, the pawl 52 is adapted to engage one of the notches 53 of the index plate 45 to rotate the latter and with it the work support 29, but when the arm 50 is rotated in the opposite direction, the pawl 52 rides idly over the index plate.

Pivotally mounted on a stud 55, which is secured to the plate 47 is a lever 57. To this lever 57 there is secured a locking-dog 58 which is adapted to engage the notches of the index plate to lock the cutter 30 between indexing operations and during the grinding of its blades. The locking-dog 58 is constantly urged into engagement with the index plate 45 by a spring-pressed plunger 60 which is housed within a housing formed in an arcuate flange 61 integral with the plate 47. The arm 57 carries on its rear side a roller 62 which is adapted to be engaged by a cam or shuttle 63 that is secured by screws 64 to an arm 65. The arm 65 is pivotally mounted at 66 on the arm 50 and has a tail portion 67 which is engaged by a spring-plunger 69. The spring-plunger 69 is housed in the arm 50 and serves to resiliently hold the cam or shuttle 63 in position to engage the roller 62 on movement of the arm 50 in a counterclockwise direction.

The shuttle or cam 63 has a beveled underface at one end as indicated at 63' and a beveled upper face at its other end as indicated at 63''. During the movement of the arm 50 in a counterclockwise direction, the surface 63'' of the cam rides under the roller 62, lifting the arm 57 and disengaging the locking dog 58 from the index plate 45. The pawl 52 then engages the index plate to effect the indexing operation. The pawl is constantly urged toward engagement with the index plate by a spring 68 housed in the arm 65. During the clockwise movement of the arm 50 in its return to starting position, after the indexing operation has been completed, the surface 63' of the cam 63 rides over the roller 62, leaving the locking dog in engagement with the index plate. To permit of this movement, the arm 65 is pivotally mounted, as described, and the cam 63 is yieldably held in operative position by the action of the spring plunger 69.

To control the arc of operative movement of the pawl 62, a deflector guard is provided, as indicated at 70. This can be secured in any of several positions of adjustment by means of a screw 71 which is passed through the arcuate slot 72 in the deflector and may be threaded into one of the several holes 73 formed in the plate 47. By adjusting the deflector 70, the pawl may be caused to rotate the index plate through one or more notches, depending upon the position of the deflector.

The locking-dog 58 can be withdrawn from engagement with the index plate 45 by manual rotation of the stud 75 which is journaled in the flange 61. The inner end 76 of this stud is eccentrically turned. When the stud is rotated around from the position shown in Figure 2, this eccentric portion 76 engages the head of a screw 77 which is adjustably threaded into a lug 78 formed integral with the arm 57. This rocks the arm 57 about its pivot 55 lifting the locking dog 58 out of engagement with the index plate. When this is done, the cutter can be rotated by means of the pinion 35 and gear 34 in order to test the height of the blades, as referred to above. The pinion 35 is mounted upon a shaft which is journaled in the plate 47 and which may be rotated by the handwheel 79 (Figs. 2–3).

So far as has been described, the indexing mechanism shown in the drawings operates on the same principle as the indexing mechanism described in the patent to Arthur L. Stewart et al. No. 1,404,243 of January 24, 1922, although it differs from the same in certain constructional details and improvements.

The arm 50 is oscillated to effect indexing of the work and re-setting of the index mechanism by reciprocation of a bar 80. This bar is formed with a set of rack-teeth 81 which mesh with the teeth of a spur gear segment 81' formed on the periphery of the arm 50. The bar 80 slides in suitable guides or bearings formed in the housing 82. It projects through the end plate 85 closing one end of the housing 82. The bar 80 is connected, externally of the housing 82, with a piston rod 87, the connection being by means of a yoke-member 88. This yoke-member 88 is secured against shoulders formed, respectively, on the bar 80 and the piston rod 87 by means of nuts 89 and 90, respectively, which thread onto the end of the bar and piston rod, respectively, and which are secured in position by lock-washers 91. The piston rod 87 slides through an opening in the cover plate 85.

The housing 82 is cored to provide a cylinder 94. The piston 95 which is secured by means of a nut 96 against a shoulder formed on the piston rod 87, reciprocates in this cylinder 94. It will be seen that as the piston moves back and forth, the bar 80 is reciprocated through the yoke connection between the piston rod and the bar and thus the arm 50 is oscillated to operate the index mechanism. The reciprocation of the piston 95 is effected hydraulically, as will hereinafter be more fully described.

The grinding wheel W, which is used for sharpening, is secured to a spindle which is journaled in suitable bearings in an oscillatable support 100 that is pivotally mounted at 101 upon a bracket 102 formed integral with and extending upwardly from the trough portion of the base 10 of the machine.

The grinding wheel W is rotated continuously during the operation of the machine, being driven from a motor 104 through a belt 106 which passes over a pulley 107, that is secured to the armature shaft of the motor 104, and over a pulley 108, that is secured to the wheel spindle. The motor 104 is suitably mounted in a bracket 109 that is secured by bolts 110 within the base of the machine.

There is a bracket 112 secured by means of screws 111 to one side of the support 100. This bracket is connected by means of a screw 113 with a bell-shaped member 114. The bell-shaped member 114 is pivoted upon a bar 116 that slides in a guide 117 which is secured by means of screws 118 to the side of the base 10.

The bar 116 is connected at its lower end to a piston-rod 120. The connection is by means of a horseshoe washer 121 which is engageable under the head of the piston rod and which may be inserted or removed through T-slot 122 formed in the bar 116, when the bar 116 is in its lowermost position. The nut 123 and washer 124 serve to secure the piston rod 120 against movement relative to the bar 116.

The piston rod 120 is connected to a piston 130 which slides in a cylinder 131 formed in a casting 128 secured to the base 10. The piston rod passes through a cap member 125 and a packing 126. The lower end of the cylinder is closed by a cap member 132. The piston is secured on the rod 120 by nuts 133 and 134.

The piston 130 is reciprocated by application of fluid pressure alternately to its opposite ends. As the piston reciprocates, it reciprocates the bar 116, oscillating the support 100. The bell-shaped member 114 is pivoted on the bar 116 to allow of the rocking movement of the tool support 100, while the screw 113 permits of an adjustment being made to control the arc of oscillation of this support. As the tool support oscillates, the grinding wheel is passed across the face of one of the blades of the cutter and then swung clear of the blade.

The hydraulic control and operating mechanism for the index and feed pistons 95 and 130 will now be described. 140 designates a control valve which slides in a bore 146 formed in the casting 128. The upper end of this valve projects through an opening formed in the cover plate 142 and to this end of the valve there is secured a bar 143. This bar is formed with an opening through which the piston rod 120 slides. The bar 143 is shifted back and forth in the movement of the piston rod by alternate engagement with the bar of the shoulder 144 formed on the piston rod 120 and the collar 145 secured to the piston rod. Shifting of the bar 143 causes control valve 140 to be shifted in the bore 146 of the casting.

150 designates the reverse valve. This is mounted for sliding movement in a bore 151 formed in the casting 128.

155 designates the fluid-pressure pump which may be of any usual or suitable construction. The pump is driven from a motor 156, both pump and motor being suitably mounted within the base 10 of the machine.

The motive fluid is pumped from the pump 155 to the chamber 151 of the reverse valve through the piping 158 and the port 159. Exhaust from the chamber 151 is through the ports 160 and 161, and the lines 162 and 163, respectively, to the piping 164, whence the exhaust fluid flows back into the sump. The chamber 151 is connected with the lower end of the feed cylinder 131 by the port 166 and line 167. There is a throttle valve 168 interposed in the line 167. This valve may be of any usual or suitable construction and is adjustable for the purpose of controlling the rate of feed or swing of the grinding wheel across the faces of the blades to be ground. The chamber 151 is connected, also, with one end of the index cylinder through the port 170, the line 171, the three-way valve 172, the line 173, the chamber 174 of a tappet valve 175 and the port 176 which opens into the index piston chamber 94. The chamber 174 of the tappet valve is bored into the housing 82.

The opposite end of the index piston chamber 94 is connected with the upper end of the feed piston chamber 131 through the port 178, the chamber 179 of a tappet valve 180 and the piping 181.

A line 185 disposed approximately midway the length of the two valve chambers 151 and 146 connects these two chambers together. Opposite ends of the reverse valve chamber 151 are further connected with the control valve chamber 146 by lines 186 and 187, respectively, which communicate with the chamber 146 at either side of the line 185. The chambers 151 and 146 are further connected by lines 188 and 189.

When the parts are in the position shown in the drawings, the pressure fluid is being supplied from the pump 155 through the line 158 and port 159 into the reverse valve chamber 151. Thence it flows through the port 166 and line 167 into the lower end of the cylinder 131, forcing the feed-piston 130 upwardly in this cylinder. This causes the wheel support 100 to be rocked towards the cutter 30. As the piston 130 rises upwardly in the cylinder 131, the fluid above the piston is forced out of the cylinder 131 into the line 181. Thence it flows through the tappet valve chamber 179, and the port 178 into the index cylinder 94. This causes the piston 95 to move to the left in the cylinder 94, carrying the rack-bar 80 also to the left through the connection between this bar and the piston-rod 87.

The movement of the rack-bar 80 to the left causes the arm 50 to be rocked counter-clockwise on the hub of the plate 47. In this movement, the cam 63 engages the roller 62, lifting the locking-dog 58 out of engagement with the index plate. Immediately thereafter, the pawl 52 rides off of the deflector 70 and engages a notch of the index plate, rotating the plate and the cutter 30 to index the cutter and bring a new blade of the cutter into position for sharpening.

The indexing of the cutter occurs during the first part of the feed movement of the grinding wheel and while the grinding wheel is still out of engagement with the cutter. The feed stroke of the grinding wheel must be long enough, therefore, to permit of the indexing operation taking place before the grinding wheel contacts the blade, otherwise the wheel would be shattered or the blade damaged.

In the continued upward movement of the piston 130 and after the indexing operation has taken place, the grinding wheel is brought into engagement with that blade of the cutter which has just been indexed into position and is passed across that blade to sharpen the same back. During the indexing operation, the motive fluid is exhausted from the left end of the cylinder 94 through the port 176, the tappet valve chamber 174, the line 173, the three-way valve 172, the line 171, the port 170, the port 161, the line 163 and the piping 164 back to the sump.

As the piston 130 nears the upper limit of its travel in the cylinder 131, the shoulder 144 of the piston rod strikes the bar 143 and in the continued upward movement of the piston 130, the control valve 140 is shifted upwardly in its chamber 146. This now puts the line 186 on supply from the piping 158 through the port 159 in the reverse valve chamber and the line 185 connecting the reverse valve chamber with the control valve chamber 146. At the same time, the line 187 leading from the lower end of the reverse valve chamber is put on exhaust through the line 189, the port 161, the line 163 and the piping 164. Thus the reverse valve 150 is moved downwardly in its chamber 151. This movement puts the line 171 on supply from the line 158 and port 159 while the line 167 is put on exhaust through the ports 166 and 160, the line 162 and the piping 164.

Supply through the line 171 causes the index piston 95 to be moved back to the right, the line 171 being connected with the index cylinder 94 through the three-way valve 172, the line 173, the tappet valve chamber 174, and the port 176.

As the index piston 95 moves to the right, fluid in the cylinder 94 which is on the right end of the piston 95 is forced out of the cylinder 94 through the port 178, the tappet valve chamber 179, and the line 181 into the upper end of the cylinder 131, forcing the piston 130 downwardly in the cylinder 131. At this time, the lower end of the cylinder 131 exhausts through the line 167.

The movement of the piston 95 to the right operates to reset the index mechanism so that it will be ready for another indexing operation at the proper time in the operating cycle. In this movement of the piston 95 to the right, the rack bar 80 is moved to the right, also, rocking the arm 50 back in a clockwise direction. The pawl 52 ratchets idly over the index plate 45 and the cam 63 rides under the roller 62 without disengaging the locking dog 58, this movement being permitted by the pivotal mounting of the arm 65 which carries the cam 63.

As the piston 130 moves downwardly in its cylinder 131, the wheel support 100 is rocked outwardly away from the cutter and the wheel is withdrawn out of engagement with the cutter blades. The re-setting of the index mechanism occurs during the first part of this withdrawal motion.

As the piston 130 nears the lower limit of its travel in the cylinder 131, the collar 145 on the piston rod strikes the bar 143 and in the further downward movement of the piston 130, the control valve 140 is carried downwardly in its chamber 146 and shifted back to the position shown in the drawings. When the control valve reaches this position, the line 187 is again put on supply from the line 158 through the port 159 and the line 185, while the line 186 is again put on exhaust through the line 188, the port 160, the line 162 and the piping 164. Thus the reverse valve 150 is moved upwardly in its chamber 151 and returned to the position shown in the drawings. This again reverses the direction of movement of the feed piston 130 and the grinding wheel is moved back toward the cutter. During the first part of this new feed movement, the cutter is indexed as described above and when the grinding wheel again returns into engagement with the cutter, it will operate upon the face of a new blade.

It will be noted from the above description that the index and feed mechanisms are hydraulically interlocked for when the feed piston 130 is moving upwardly in its cylinder 131, the fluid on the upper side of the piston 130 is forced out of the chamber 131 through the line 181, valve chamber 179 and port 178 to cause the index piston 95 to be moved to the left in the index cylinder 94 to effect the indexing operation and likewise, when the index piston 95 is moving to the right in its cylinder, the fluid on the right end of the piston is forced back through the port 178, tappet valve chamber 179, and line 181 into the feed cylinder to move the feed piston downwardly in the feed cylinder. Further it will be noted that the complete operations of the machine can be effected by alternating the connection of the supply and exhaust lines with the two cylinders 131 and 94, one cylinder being on supply at the same time that the other is on exhaust. It will be noted, further, it is required that there be only two lines leading to the index bracket and that despite this fact, the index and feed cylinders are interlocked. In a machine requiring as many adjustments as does the machine illustrated in the drawings in order to bring the grinding wheel and cutter into operative relation, it will be seen that the simplification made possible by the present invention is of tremendous importance. With any interlocked hydraulic mechanism heretofore known, at least six lines leading to the index cylinder would have been required. Without the present invention, it will be seen, therefore, there would have been extreme complication and perhaps it would have been wholly impractical to operate the machine hydraulically.

The cycle of operation of the machine illustrated in the drawings is shown in Figure 4. As indicated, during the first part A of the withdrawal motion of the wheel support 100, the index mechanism is reset, as indicated by R. The resetting operation will have been completed by the time the wheel has cleared the cutter. The indexing mechanism remains stationary, as indicated at S, during the rest B of the withdrawal motion. Just before the wheel support reaches full-withdrawn position, the control valve is shifted to reverse the reverse valve and start the in-feed of the wheel support. During the first part C of the in-feed, the cutter is indexed, as indicated at I. To insure that the indexing operation is completed before the wheel reaches operative position, the stroke of the wheel support is increased beyond that required to take care of indexing and feed, thereby eliminating danger of indexing occurring after the wheel has engaged the work. The extra movement required to provide this safety factor is indicated by the legend "safety clearance" in the figure. The index mechanism remains stationary, as indicated at T, during the actual grinding operation indicated at D. Just before the wheel support reaches the limit of its inward movement, the control valve is again shifted, reversing the reverse valve and then the outward movement of the wheel support starts again. This completes the cycle. The cutter has been indexed and one blade ground.

The feed cylinder 131 is ordinarily of different hydraulic capacity than the index cylinder. The tappet valves 175 and 180 are provided to insure full strokes of the feed piston 130 in both directions regardless of the relative sizes of these two cylinders or of any leakage which may occur from the system. I will describe what takes place if the feed cylinder is larger than the index cylinder. The index piston 95 is moved to the left to effect indexing by fluid forced out of the left end of the feed cylinder 131 through the line 181, as above described. The pressure of this fluid and of the spring 195 keeps the valve 180 closed during this movement. When the piston 95 has moved far enough to the left, however, the piston 95 will clear the port 196 and allow excess fluid to flow through the lines 197 and 198, opening the tappet valve 175. The excess fluid over and above that required to move the index piston fully to the left in its cylinder then flows back to the sump through the chamber 174, the line 173, the three-way valve 172, the line 171, the ports 170 and 161, the line 163 and the piping 164. When the index piston travels in the reverse direction, that is, to the right, the fluid forced out of the right end of the index cylinder 94 is used to move the feed piston to the right in its cylinder to withdraw the wheel support out of engagement with the cutter. In this movement, the tappet valve 175 is closed, the line 171 being now on supply and the pressure of the motive fluid and of the spring 200 forcing the valve shut. The amount of fluid in the right end of the cylinder 94 ordinarily would not be enough to move the feed piston fully to the right, but when the index piston 95 has traveled far enough to the right, the port 201 is cleared and fluid can flow from the left side of the piston 95 through the port 201 and the lines 202 and 203. Thus the tappet valve 180 is opened and the pressure fluid may flow through the valve chamber 179 through the line 181 into the feed cylinder 131 to force the feed piston full over to the right and complete the withdrawal motion of the wheel support.

It will be seen that the same tappet valves will readily compensate for differences in capacity of the two cylinders should the index cylinder be larger than the feed cylinder.

It is sometimes desirable to operate the feed mechanism independently of the indexing mechanism as, for instance, when it is desired to grind back one of the blades of the cutter more than the others. The index mechanism can be rendered inoperative by rotating the three-way valve 172 from the position shown in the drawings to a position in which it will connect the line 171 with a line 205 which connects with the line 181.

When this is done, the pressure fluid will flow from the line 158 through the ports 159 and 166, and the line 167 to the lower end of the cylinder 131, rocking the grinding wheel support toward the cutter and causing the wheel to be passed across the face of a blade. At this time, the exhaust is through the line 181, the line 205, the three-way valve 172, the line 171, the ports 170 and 161, the line 163 and the line 164 back to the sump. As the feed piston 130 moves upwardly, the shoulder 144 of the piston rod strikes the bar 143, shifting the control valve 140 as before. The line 171 is now put on supply from the line 158 through the ports 170 and 159 and the pressure fluid now flows through the three-way valve 172 and the lines 205 and 181 to the upper end of the feed cylinder 131, withdrawing the wheel from the cutter. At this time, the exhaust is through the line 167, the ports 166 and 160, and the lines 162 and 164 back to the sump. Thus the grinding wheel can be passed back and forth any number of times across the face of an individual blade to sharpen the same back to the desired extent.

The blades may be fed into the grinding wheel after successive passages of the wheel, in order to grind off more stock by adjusting the plate 47 angularly on the plate 22 by manipulation of the screws 210 and 211 (Fig. 2). These screws thread into ears 212 and 213, respectively, formed integral with the plate 47 and engage a lug 215 formed integral with the plate 22.

The grinding wheel W may be dressed to shape in any desired manner and by any suitable means. In the drawings, a hand-operated dressing device has been shown. The diamond-holder 220 is carried in an arm 221 which is pivotally mounted at 222 upon a bracket 223 which is slidably adjustable upon a supporting flange 224 formed integral with the table 15. The bracket 223 can be secured in any adjusted position by means of a T-bolt 225, the head of which engages in a T-slot in the flange 224. A coil spring 226 which is secured at one end to the arm 221 and at the other end to the bracket 223 serves to hold the diamond normally in inoperative position but the arm 221 can be manipulated by the operator of the machine to dress the grinding wheel.

A guard 227 is provided to enclose the wheel and protect the operator. This guard is pivoted at 228 on the wheel support 100 so that it may readily be swung out of the way as when changing the wheel, etc. 230 designates an auxiliary guard or plate slidably adjustable on the main guard 227 and secured in any adjusted position by the thumb screw 231.

The novel hydraulic control and actuating mechanism is not confined to use with a grinder of the type shown nor even to grinding machines, as the interlocked hydraulic mechanism may be employed on any machine tool where it is desired to actuate two independently adjustable parts hydraulically and in timed relation. In general it may be said that while a particular embodiment of the invention has been described, it will be understood that the invention is capable of various modifications and uses and that this application is intended to cover any variations, uses, or adaptations of the invention following, in general, the principles of the invention and including such departures from the present disclosure as come within known or customary practice in the machine tool art and as may be applied to the essential features hereinbefore set forth and as fall within the scope of the invention or the limits of the appended claims.

Having thus described my invention, what I claim is:

1. In a machine of the class described, a tool support, a work support, means for producing alternate movements of feed and withdrawal between said supports comprising a cylinder and a piston reciprocable therein, means for periodically indexing the work support comprising a cylinder and a piston reciprocable therein, said two cylinders being hydraulically interlocked so that movement of one piston causes movement of the other, and means for supplying pressure fluid alternately to the two cylinders to effect their reciprocating movement.

2. In a machine of the class described, a work support, a tool support, hydraulically operated means for producing alternate relative movements of feed and withdrawal between said supports comprising a cylinder and a piston reciprocable therein, hydraulically operated means for indexing the work support comprising a cylinder and a piston reciprocable therein, means for controlling the operation of the two cylinders so that supply of pressure fluid to one end of one cylinder occurs simultaneously with its exhaust from one end of the other cylinder, and means for hydraulically connecting the other ends of the two cylinders so that movement of the piston in one cylinder causes movement of the piston in the other.

3. In a machine of the class described, a work support, a tool support, hydraulically operated means for producing alternate relative movements of feed and withdrawal between said supports comprising a cylinder and a piston reciprocable therein, hydraulically operated means for indexing the work support comprising a cylinder and a piston reciprocable therein, a single reverse valve controlling the operation of the two hydraulic mechanisms, said valve being hydraulically connected with the two cylinders so that supply of pressure fluid to one end of one cylinder occurs simultaneously with exhaust from one end of the other cylinder, means for hydraulically connecting the other ends of the two cylinders so that movement of the piston in one cylinder causes movement of the piston in the other cylinder, and means whereby movement of one piston controls the operation of the reverse valve.

4. In a machine for sharpening cutters, a frame, a tool support pivotally mounted on the frame, a work support rotatably mounted on the frame, a grinding wheel rotatably mounted on the tool support, means for oscillating the tool support comprising a piston and cylinder, one of said parts being fixed and the other being connected to the tool support, means for indexing the work support comprising a piston and cylinder, one of said parts being fixed and the other being connected to the work support, a single reverse valve for controlling the operation of the two pistons, a line connecting the reverse valve with one end of one piston, a second line connecting the reverse valve with one end of the other piston, a third line connecting the other ends of the two pistons together, and means for operating the reverse valve to supply pressure fluid alternately through the first two lines, the connections between the two lines and the reverse valve being such, also, that the supply of pressure fluid through one line occurs simultaneously with exhaust through the other.

5. In a machine for sharpening cutters, a frame, a tool support pivotally mounted on the frame, a work support rotatably mounted on the frame, a grinding wheel rotatably mounted on the tool support, means for oscillating the tool support comprising a piston and cylinder, one of which is fixed and the other of which is connected to the tool support, means for indexing the work support comprising a piston and cylinder, one of which is fixed and the other of which is connected to the work support, a reverse valve for controlling the operation of the two pistons, a line connecting the reverse valve with one end of one piston, a second line connecting the reverse valve with one end of the other piston, and a third line connecting the other ends of the two pistons together, and means connecting one of said pistons to the reverse valve so that said piston in its movement operates said valve thereby to supply pressure fluid alternately through the first two lines, said two lines being so connected to the reverse valve, also, that the supply of pressure fluid through one line occurs simultaneously with exhaust through the other.

6. In a machine of the class described, a pair of movable parts and means for actuating the same comprising a pair of cylinders and a pair of pistons reciprocable therein, means connecting one end of one piston alternately to fluid supply and exhaust, means connecting one end of the other piston alternately to fluid supply and exhaust, means connecting the other ends of the two cylinders together, a pair of ducts leading at points intermediate the ends of one cylinder, respectively, to lines leading from the opposite ends of said cylinder, valves adapted to maintain said ducts closed until the corresponding piston has moved in either direction in said cylinder far enough to open said ducts to the pressure fluid, and a reversing valve controlling the connection of said cylinders to supply and exhaust whereby when one cylinder is on supply, the other is on exhaust.

ROBERT S. CONDON.